Jan. 29, 1924.

H. H. TOLLEFSON

TRAP

Filed March 1, 1920

1,482,329

Inventor
Hjalmer H. Tollefson

By
Attorney

Patented Jan. 29, 1924.

1,482,329

UNITED STATES PATENT OFFICE.

HJALMER H. TOLLEFSON, OF SCANDINAVIA, WISCONSIN.

TRAP.

Application filed March 1, 1920. Serial No. 362,311.

*To all whom it may concern:*

Be it known that HJALMER H. TOLLEFSON, a citizen of the United States of America, residing at Scandinavia, in the county of Waupaca and State of Wisconsin, has invented new and useful Improvements in Traps, of which the following is a specification.

The object of the invention is to provide a simple, efficient and novel trap of the type wherein the jaws consist of relatively narrow plates, wherein the structure is designed especially for use under water for trapping such game as beavers, otters, mink, muskrats, raccoons and the like, and under conditions contemplating arrangement of the device on the paths or customary runways of the animals, and with this object in view the invention consists in a construction and combination of parts of which a preferred embodiment is shown in the drawings, wherein.

Figure 1:
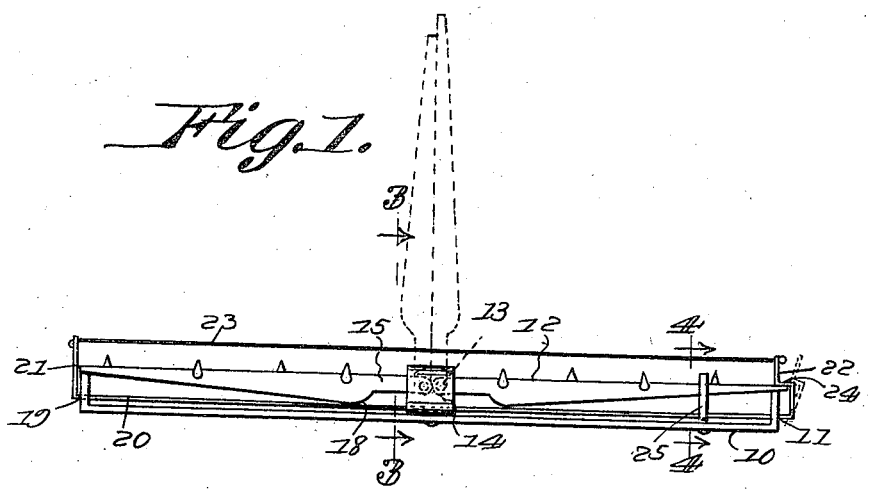
Figure 1 is a front view of the trap.
Figure 2:
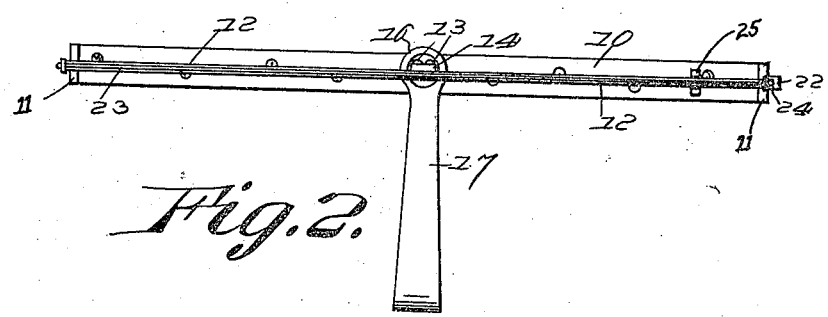
Figure 2 is a plan view.
Figure 3:
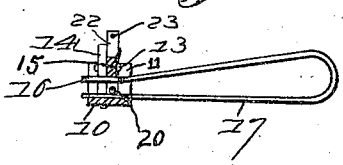
Figure 3 is a cross section on the plane indicated by the line 3—3 of Figure 1.
Figure 4:
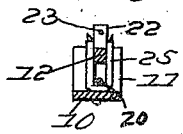
Figure 4 is a section on the plane indicated by the line 4—4 of Figure 1.

The device consists essentially of a base 10 having upturned terminals 11 forming seats for the jaws or blades 12 which are pivoted as at 13 to an ear 14 rising from the center of the base, the inner reduced or shank portions 15 of said jaws being engaged by an eye 16 of the actuating spring 17, and said jaws also being provided at the upper extremities of the reduced or shank portions with cam faces 18 for engagement by the eye 16 to insure the firm rocking of the jaws in engaging relation with the game when the trap is sprung.

A trigger frame 19 is mounted upon the base with a longitudinal spindle portion 20 thereof fitted in suitable bearings or openings in the upturned extremities 11, and having terminal arms 21 and 22 connected by a trip element 23 consisting of thread, light cord, wire or the equivalent thereof. The arm 22 of the trigger is provided with an inturned or offset portion forming a shoulder 24 for engagement with the extremity of one of the jaws, and a guide 25 is carried by the base in position to receive the jaw thus engaged by the trigger to hold the former in proper position to be engaged when the trigger is in an upright position.

It will be noted that the trip element 23 is located above the plane of the jaws and all other parts of the trap so as to be in the path of an animal walking or swimming adjacent thereto. Further, it will be noted, from Figure 1, that the arm 22, unless engaged by the trip element 23, has a spring tendency away from the engaged extremity of the jaw 12. Thus the engagement of a victim with the trip element 23, if it results in breakage of the latter will result in the release of the jaws by the deflection of the arm 22 as shown in dotted lines in Figure 1; or if the trip element be not broken, the trigger will be rocked upon its axis represented by the spindle 20 to release the jaws and permit them to be moved by the actuating spring to the closed position indicated by dotted lines in Figure 1. The jaws may as illustrated be provided with suitable spurs 26 to adapt them to more efficiently engage and hold the trapped game.

What is claimed is:

An animal trap having a base bar provided with upturned terminals, jaws mounted upon the base bar and adapted when open to engage said terminals as rests, an actuating spring operatively connected with said jaws to move them to closed position, and a trigger consisting of a rocket mounted upon the base and having terminal upstanding arms of which one is offset to provide a shoulder for engagement with the extremity of one of the jaws, said offset arm having a normal spring tendency away from the engaged jaws, and a flexible trip member connecting the arms of the rocker and counteracting the spring tendency of the offset arm while providing means for the actuation of the rocker.

In testimony whereof he affixes his signature.

HJALMER H. TOLLEFSON.